Dec. 10, 1957  F. E. PAYNE ET AL  2,815,967
ROTARY MECHANICAL SEAL AND METHOD OF ASSEMBLING THE SAME
Filed May 24, 1954  2 Sheets-Sheet 1
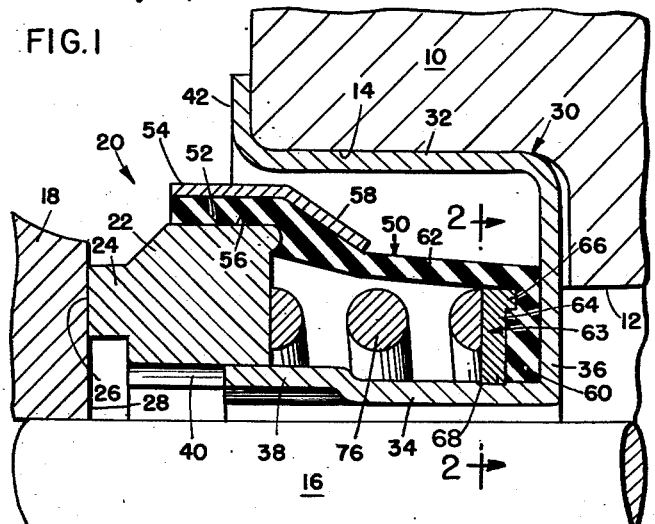
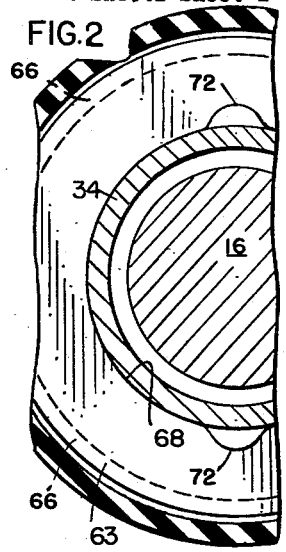
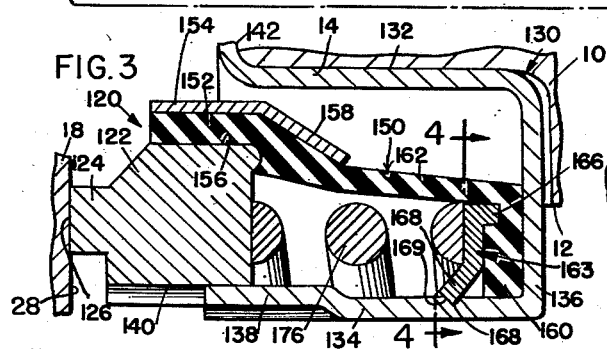
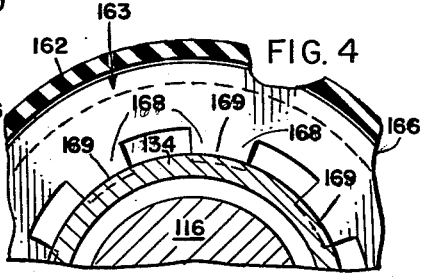
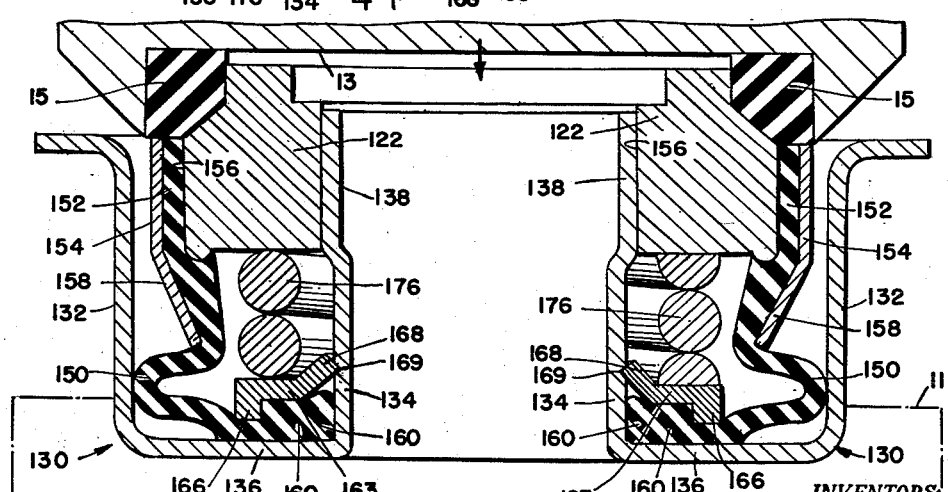
INVENTORS:
FRANK E. PAYNE
PAUL T. HAAKE
BY Edward R. Lowndes
AGENT Dec. 10, 1957     F. E. PAYNE ET AL     2,815,967
ROTARY MECHANICAL SEAL AND METHOD OF ASSEMBLING THE SAME
Filed May 24, 1954     2 Sheets-Sheet 2
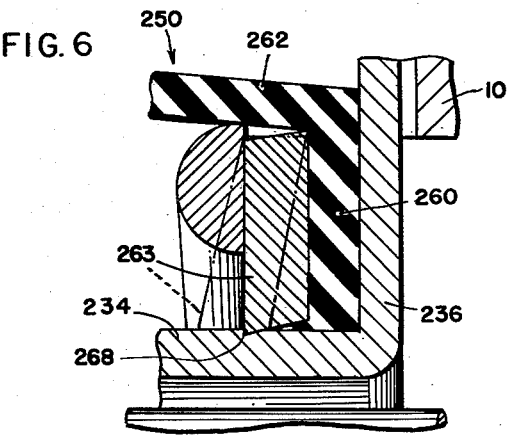
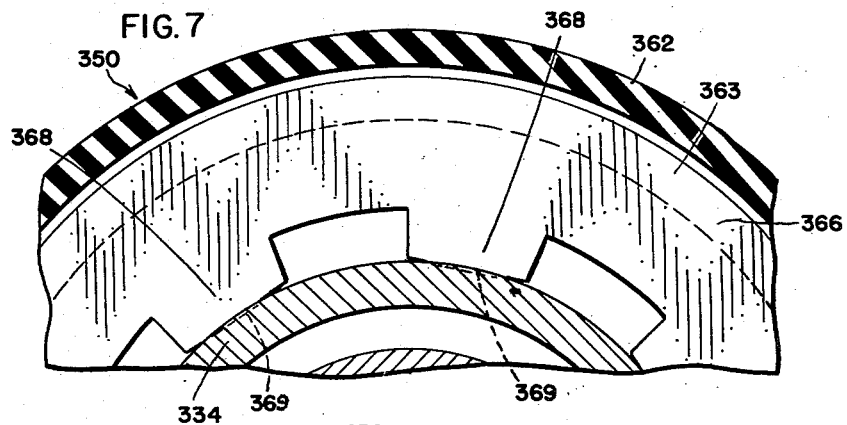
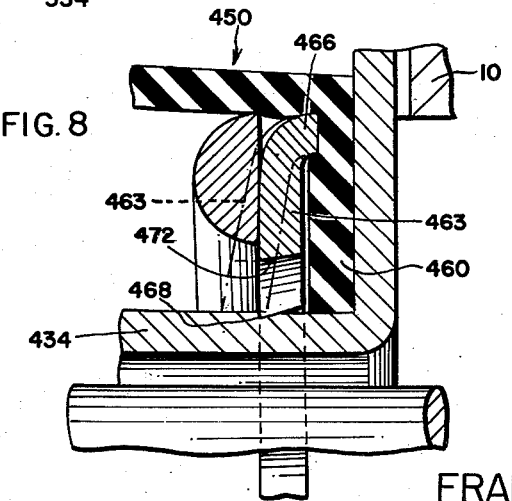
INVENTORS:
FRANK E. PAYNE
PAUL T. HAAKE
BY Edward R. Lowndes
AGENT United States Patent Office 2,815,967
Patented Dec. 10, 1957

2,815,967

ROTARY MECHANICAL SEAL AND METHOD OF ASSEMBLING THE SAME

Frank E. Payne, Glencoe, and Paul T. Haake, Park Ridge, Ill., assignors to Crane Packing Company, Chicago, Ill., a corporation of Illinois Application May 24, 1954, Serial No. 431,864

9 Claims. (Cl. 286—11)

The present invention relates to improvements in shaft seals and also to a method of assembling the same. More particularly the invention relates to a rotary mechanical seal for effecting a seal against the passage of fluid between relatively movable machine parts, as for example between a shaft and a machine casing within which the shaft is rotatably mounted. Specifically, the invention relates to a sealing device of this character in which the sealing effect between the relatively moving parts occurs at radially extending surfaces and wherein a so-called running seal is provided between these moving parts.

For purposes of illustration the invention has been shown and described in connection with a water pump of the type commonly employed by the automotive industry for use in connection with automobiles although it will be understood of course that the invention is not to be limited to this specific use. One type of seal designed for this purpose has been shown and described in the patent to Frank E. Payne, No. 2,645,508, dated July 14, 1953, for Rotary Mechanical Seal, and the present invention has been designed as an improvement over this type of seal. In the assembly of seals of the type illustrated in the above mentioned patent it is desirable that the installation be made with a minimum of effort so that the operator may devote as little time and thought as possible to the assembly of the seal with which each pump is equipped. Seals of this nature are a specialty and a more effective and proper assembly can be performed by the seal manufacturer at the factory than can be attained by individual installation so that thereafter the preassembled seals may be handled as complete "package-type" units.

The rotary mechanical seal shown in the above mentioned patent involves in its general organization a package-type unit including a cup-shaped retainer adapted to be forced by a press fit into a recess provided for it in the pump housing. The retainer includes a central cylindrical wall or sleeve portion which immediately surrounds the pump shaft and an outer cylindrical wall which is pressed into the recess in the pump casing and the two walls are connected together by a radial end wall. A sealing washer surrounds the inner cylindrical wall of the retainer and is sealed with respect to the retainer by means of a deformable bellows of elastomeric material, the forward end of which is connected to the washer in sealing relationship and the rear end of which is formed with an inturned flange which is compressed against the end wall of the retainer by means of a compression spring which bears at one end against the inturned wall of the bellows and at the other against the washer to wedge the latter forwardly into engagement with a cooperating seat usually provided on the pump impeller. In order to prevent removal of the washer, bellows and spring from the retainer, it has been customary to firmly bond the inturned end of the elastomeric bellows to the end wall of the retainer, a suitable adhesive such as rubber cement being employed for this purpose. The cement is sprayed into the retainer by an operator immediately prior to installation of the sub-assembly unit including the washer, spring and bellows. When this sub-assembly is telescoped over the central cylindrical wall of the retainer and pressure is applied thereto so as to compress the spring, the inturned end of the bellows will be forced against the rear end wall of the retainer and adhered thereto by virtue of the prior application of adhesive to the retainer.

The assembly of seals of this type in the manner briefly outlined above cannot be accomplished in a uniform manner and with uniform results inasmuch as the spraying operation is a manual one under the control of the operator who may apply too little or too much of the adhesive so that after the sub-assembly has been applied to the retainer different adhesive characteristics will obtain. It has been found that during normal assembly operations, seals of this type will withstand a tensile strength of approximately thirty pounds on the flange but occasionally where too little adhesive has been applied the parts will separate under a tensile pull of two or three pounds. Furthermore, the use of an adhesive method for effecting the assembly requires a drying period of approximately sixteen hours which requires special handling and which thus considerably contributes to the overall cost of the seal.

The present invention is designed to overcome the above noted limitations that are attendant upon the assembly of seals of this character and toward this end it contemplates the provision of a simple yet extremely efficient clamping means whereby the inturned or flanged end of the elastomeric bellows may be firmly clamped to the end wall of the retainer in sealing relationship with respect thereto in such a manner that dislodgement thereof is practically impossible without rupture of the bellows. The provision of the clamping device which constitutes the present invention completely dispenses with the necessity of employing a bonding agent, thus automatically eliminating this more or less messy assembly problem while at the same time eliminating the necessity of resorting to a prolonged drying period so that the seals may be taken from the assembly line in completely finished condition and immediately packaged for shipment.

The provision of a rotary mechanical seal which greatly facilitates assembly operations as outlined above and which when assembled, is possessed of greater tensile strength so that it will resist any tendency to separate into its component parts being among the principal objects of the invention, other objects and advantages thereof will become more readily apparent as the nature of the invention is better understood.

In the accompanying single sheet of drawings forming a part of this specification several preferred embodiments of the invention have been shown.

In these drawings:

Fig. 1 is a fragmentary quarter sectional view taken transversely through one form of seal assembly constructed in accordance with the principles of the present invention.

Fig. 2 is a full sectional view taken substantially along the line 2—2 of Fig. 1.

Fig. 3 is a quarter sectional view taken substantially centrally and longitudinally through a modified form of seal assembly.

Fig. 4 is a sectional view taken substantially along the line 4—4 of Fig. 3.

Fig. 5 is a sectional view, somewhat schematic in its representation, showing the manner in which the seal of Fig. 3 is assembled.

Fig. 6 is a fragmentary quarter sectional view taken longitudinally through a further modified form of seal assembly.

Fig. 7 is a sectional view similar to Fig. 4 illustrating an additional modified form of the invention, and Fig. 8 is a sectional view similar to Figs. 6 and 7 showing yet another modified form of the invention.

Referring now the drawings in detail, in Figs. 1 and 2 one form of seal assembly constructed in accordance with the principles of the present invention has been shown as being applied to a pump construction including a housing 10 having an opening 12 formed therein provided with a counterbore 14. The pump shaft 16 extends through the opening 12 and carries the usual pump impeller 18. The seal assembly is designated in its entirety at 20 and includes a sealing washer 22 having a forwardly extending nose portion 24 on which there is formed a substantially flat annular radially disposed sealing surface 26 designed for running sealing engagement with a similarly flat sealing surface 28 provided on the hub portion of the impeller 18. The washer 22 may be formed of any one of a number of known materials which have been proven effective as sealing elements as for example a molded thermosetting resin having dispersed therein metal particles for better heat conductivity and good wear resistance. The washer 22 is nested within a generally cylindrical retainer or shell 30 which is in the form of a light sheet metal stamping of one piece construction having an outer cylindrical wall 32, an inner cylindrical wall 34 providing a center post and an interconnecting radial wall 36. The washer 22 is slidable upon the inner cylindrical wall 34 and a pair of diametrically opposed outwardly struck ribs 38 formed on the wall 34 extend into longitudinal grooves 40 formed in the inner cylindrical bore of the washer 22. The ribs 38 and grooves 40 permit sliding movement of the washer 22 on the cylindrical wall 34 while preventing relative angular turning movement between these parts. The retainer 30 is pressed into the counterbore 14 of the housing 10 and an outwardly extending radial flange 42 formed on the retainer 30 serves to locate the retainer with reference to the sealing surface 28 provided on the hub of the impeller 18.

In order to effectively seal the washer 22 with respect to the retainer 30, and consequently with respect to the housing 10, a flexible sleeve or bellows member 50 preferably formed of an elastomeric material such as rubber, either natural or synthetic, or a combination of the two, is provided with a forward cylindrical region 52 which is telescopically received over the rear end of the washer 22 and clamped thereto by means of a generally cylindrical metal ferrule 54. The inside diameter of the ferrule 54 is somewhat less than the combined radial extent of the washer 22 and sleeve 50 in order that the cylindrical portion 52 may be preloaded upon the outer cylindrical surface 56 of the washer. An inclined rearwardly extending flange 58 formed on the ferrule 54 limits the forward axial movement of the ferrule during the assembly operations between the washer 22, sleeve 50 and ferrule 54.

The sleeve 50 is formed at its rear end with an inwardly extending radial flange 60 and a generally tapered region 62 connecting the flange 60 with the cylindrical portion 52.

For proper seal operation, the flange 60 must be firmly held against the inner face of the radial end wall 36 of the retainer 30. Heretofore adherence between these two parts has been effected by means of a suitable adhesive or cement which is applied to the inner face of the radial wall 36 prior to assembly operations. However in the present instance, this adherence is maintained by firmly clamping the radial flange 60 against the radial wall 36, utilizing a clamping ring 63 which effects a wedging action against the flange 60, as will be described presently, and which ring constitutes the subject matter of the present invention.

The ring 63 is preferably formed of spring steel and is of disk-like configuration, it having a circular radial portion 64 and a continuous laterally turned rim or flange 66 at the periphery thereof. The ring 63 is adapted to be telescopically received over the cylindrical wall 34 of the retainer 30 during the assembly operation and driven to a home position as shown in Fig. 1 wherein the flange 66 extends into the elastomeric material of the radial flange 60 and wherein the inner peripheral edge 68 of the ring bites into the soft metal of the cylindrical wall 34 and prevents retraction of the ring along the cylindrical wall 34.

The central opening provided in the clamping ring 63 has a diameter which is substantially equal to or slightly less than the overall diameter of the cylindrical wall 34 of the retainer 30 so that there is practically no play permitted between the two parts. In order to permit the ring 63 to be inserted over the cylindrical wall 34, notches or voids 72 are provided at diametrically opposed regions and these notches are aligned with the outwardly struck ribs 38 when the ring 63 is applied to the cylindrical wall. A coil spring 76 bears at one end against a face of the clamping ring 63 and at the other end against the rear face of the washer 22 and normally urges the washer 22 forwardly so that an initial sealing pressure is developed between the sealing surface 26 on the washer and the seat surface 28 on the impeller hub 18.

In the assembly of the seal, as will be more fully described hereinafter, the clamping ring 63 is caused to be inserted over the cylindrical wall 34 of the retainer and pushed rearwardly therealong so as to compress the flange 60 of the bellows 50 against the radial wall 36 of the retainer 30. When the pressure applied to the clamping ring 63 is released, the clamping ring will be retained in firm engagement with the flange 60 inasmuch as the forward inner edge 68 of the ring will engage and bite into the metal of the cylindrical wall 34 and prevent retraction of the clamping ring.

It is to be noted that the flange 66 which is located at the periphery of the clamping ring 63 exerts a greater pressure on the elastomeric flange 60 than does the remainder of the body portion of the ring 63 so that there is a tendency for the ring 63 to become slightly flexed or dish-shaped. The amount of flexing actually encountered is scarcely noticeable yet it is sufficient to cause the sharp inner edge 68 of the ring to bite into the metal of the cylindrical wall 34 or center post of the retainer 30. The materials employed for the retainer 30 and for the clamping ring 63 are selected so as to enhance the binding action between the ring 63 and center post 34 as previously explained. For best results, the metal of the clamping ring should be at least as hard as or preferably harder than the metal of the retainer and, where the retainer is formed of brass, as it almost invariably is in actual practice, the material of the clamping ring may be formed of steel or if desired of special hardened or spring steel.

In the form of the invention shown in Figs. 3 and 4 the same principle of effectively sealing the elastomeric flange 60 of the bellows 50 to the radial wall 36 of the retainer 30 is preserved but the form of the clamping ring provided for this purpose has been slightly modified. In this illustrated form of the invention, to avoid needless repetition of description, similar characters of reference have been employed to the corresponding seal assembly parts in Figs. 1 and 2.

In Figs. 3 and 4 the clamping ring 163 is in the form of a ring or disk, the outer rim of which is turned laterally as at 166 so that it may embed itself in the elastomeric material of the bellows flange 160 when the member is in operative clamping position on the center post 134 of the retainer 130. The member 163 is formed with a series of circumferentially spaced inwardly projecting and rearwardly inclined teeth 168, the free ends of which present arcuate surfaces 169 having a radius of curvature substantially equal to the radius of curvature of the overall radius of curvature of the center post 134. The radial extent of the teeth 168 is such that, when the member 163 is telescopically received over the center post 134, the teeth 168 will be sprung slightly from their normal positions so that the innermost arcuate edges of the arcuate surfaces 169 thereof will bear against the cylindrical surface of the center post 134 with a considerable degree of pressure so that when the member 163 is driven to its home position against the flange 160 and released during assembly operations, the arcuate edges of the teeth will actually bite into the relatively soft metal of the retainer and prevent backing up of the member 163. Thus with the member 163 in the final position shown in Fig. 3, the elastomeric material of the bellows flange 160 will be compressed and firmly pressed against the inner surface of the end wall 136 of the retainer 130. It is to be noted that the distance existing between adjacent teeth 168 is slightly greater than the overall circumferential width of the driving ribs 138 provided on the center post 134 so that during assembly operations one of the voids existing between adjacent teeth 168 may be aligned with each of the ribs 138 to permit insertion of the locking member 163 into the retainer and subsequent movement of the same to its final or home position.

In Fig. 6 another modified form of clamping ring is illustrated and again, as in further illustrated views, subsequently to be described, the reference numerals employed for descriptive purposes are correlated with those employed in describing Figs. 1 and 2.

In the form of the invention shown in Fig. 6, the clamping ring 263 assumes the form of a parallelogram in radial cross section, the parallelogram being on a slight bias, as for example a 10° angle so that the obtuse angles thereof are approximately 100° and the acute angles are approximately 80°. The ring, which may be formed of steel, in its free stae, is thus slightly dish-shaped as shown in dotted lines and presents a relatively sharp edge 268 corresponding to the edge 68 in the form of the invention shown in Figs. 1 and 2. When the ring 263 is pressed to its home position by a suitable die mechanism such as that shown in Fig. 5, the ring will be deformed to an approximately radial condition so that the radial elastomeric flange 260 will be compressed against the retainer wall 236. Upon release of pressure the sharp edge 268 will bite into the soft metal of the center post 234 and hold the ring 263 against retraction therealong.

In Fig. 7 a slightly modified form of clamping ring from that shown in Fig. 4 has been disclosed. In this form of the invention the clamping ring 363 is formed with a series of teeth 368 which, instead of having arcuate inner edges as shown in Fig. 4, have straight edges 369 so that the teeth engage the center post 334 only at limited regions therealong to create the desired binding effect.

In Fig. 8, still another modified form of clamping ring is shown. This view is similar to Fig. 6 and the clamping ring 463 therein is formed on an approximately 10° bias while the outer peripheral edge of the ring is turned laterally as at 466 to provide a rearwardly extending rim adapted to become embedded in the elastomeric material of the flange 460 when the ring 463 is driven to its home position by the mechanism of Fig. 5. As in the case of the ring 263, the ring 463 is provided with a relatively sharp edge 468 designed to bite into the soft brass material of the center post 434 when the ring is under stress. The ring 463 assumes a generally radial flat condition when fully applied in the seal structure.

In Fig. 5 the method of assembling the various seal parts has been more or less diagrammatically illustrated. In this view a seal assembly involving the use of the clamping member 163 has been shown schematically. The washer 122, spring 176, clamping member 163, bellows 150 and ferrule 154 are preassembled in substantially the relative positions which they will occupy in the assembled seal and the entire sub-assembly just mentioned is loosely inserted within the retainer with the latter being suitably supported in a cup-shaped die or block member 11 which, when assembly line methods are employed, may constitute one of a series of such block members carried on a conveyor. The final and permanent assembly is made by lowering a suitable plunger head 13 having an annular compressible contact ring 15 associated therewith into engagement with the washer 122. The head 13 may be associated with the assembly conveyor and when the slot is aligned with the block 11 and continued downward movement thereof takes place, the washer 122 will serve to compress the spring 176 so that the various convolutions thereof are brought into solid metal-to-metal contact to produce a rigid and incompressible spring body. The pressure exerted by the press head 13 upon the washer 122 is exerted through the incompressible spring body directly to the retaining ring 163 which is caused to slide downwardly on the upstanding post portion of the retainer created by the cylindrical wall 134 until such time as a predetermined degree of compression of the flange 160 of the bellows 150 has been attained. During this lowering of the press head 13, the central region of the clamping ring 163 will flex rearwardly so that the edge 169 will slide more or less freely along the center post 134 without much resistance. When the clamping ring has been driven to its home position wherein it is in firm engagement with the elastomeric flange 160, the press head 13 is elevated so that the spring 176 may resume its normal condition. The clamping ring 163 however will be retained in firm engagement with the radial flange 160 of the bellows 150 inasmuch as the arcuate edges 169 of the teeth 168 of the clamping ring 163 will engage and bite into the soft metal of the cylindrical wall 134 so as to cause the clamping ring to become wedged, so to speak, between the surface of the cylindrical wall 134 and the elastomeric flange 160 and thus prevent retraction of the clamping ring. As soon as the pressure applied to the washer 122 by the press head 13 is released, the seal assembly is complete and capable of immediate use or packaging for shipment as desired.

The invention is not to be limited to the exact arrangement of parts shown in the accompanying drawings or described in this specification as various changes in the details of construction may be resorted to without departing from the spirit of the invention.

What we claim and desire to secure by Letters Patent is:

1. In a rotary mechanical seal of the character described, in combination a washer having an inner and an outer cylindrical surface and a front face providing a radial sealing surface adapted to bear against another radial sealing surface with a running fit, a deformable sleeve of elastomeric material having a radially disposed inwardly extending flange at one end, a substantially cylindrical region at its other end and a deformable intermediate region adapted to accommodate relative axial movement between the ends of the sleeve, means for compressing the cylindrical region of the sleeve against the outer cylindrical surface of the washer to form a fluid-tight connection therebetween, a retainer having a central cylindrical portion extending into said washer and serving to support the same, and a radial wall against which the inwardly disposed flange of said deformable sleeve bears, a clamping ring surrounding said cylindrical portion of the retainer, said clamping ring, in its free state, having an internal diameter slightly less than the external diameter of said cylindrical portion of the retainer, said clamping ring also being provided with a relatively sharp circular edge at its inner periphery, said clamping ring being telescopically received over the cylindrical portion the retainer and effectively bearing against the inwardly extending flange of the deformable sleeve and serving to compress the same against the radial wall of the retainer, the outer periphery of said clamping ring having a portion thereof offset rearwardly from the body of the ring, said rearwardly offset portion engaging the material of said inwardly extending flange whereby greater pressure is placed on the material of said inwardly extending flange in the region of the outer periphery of said clamping ring than in the region of the remainder of the body of the ring, the clamping ring being flexed in a direction to cause said circular edge thereof to bite into the material of said cylindrical portion of the retainer to prevent movement of the ring bodily away from the inwardly extending flange on the sleeve, and a coil spring disposed within the sleeve and surrounding said cylindrical portion of the retainer and bearing at one end against said clamping ring and at the other end against said washer.

2. In a rotary mechanical seal of the character described, in combination a washer having an inner and an outer cylindrical surface and a front face providing a radial sealing surface adapted to bear against another radial sealing surface with a running fit, a deformable sleeve of elastomeric material having a radially disposed inwardly extending flange at one end, a substantially cylindrical region at its other end and a deformable intermediate region adapted to accommodate relative axial movement between the ends of the sleeve, means for compressing the cylindrical region of the sleeve against the outer cylindrical surface of the washer to form a fluid-tight connection therebetween, a retainer having a central cylindrical portion extending into said washer and serving to support the same, and a radial wall against which the inwardly disposed flange of said deformable sleeve bears, there being a plurality of outwardly struck ribs on said cylindrical portion of the retainer and interlocking grooves on the inner cylindrical surface of the washer respectively to prevent relative turning movement of the washer with respect to the retainer, a clamping ring in the form of a metal disk surrounding said cylindrical portion of the retainer and having one face thereof effectively bearing firmly against the inwardly extending flange of the deformable sleeve and serving to compress the latter against the radial wall of the retainer, said disk having an inner circular edge engaging the cylindrical portion of the retainer and by such engagement preventing movement of the disk bodily away from the inwardly extending flange on the sleeve, the inner circular edge of the disk being provided with a series of notches which are aligned with the ribs on said cylindrical portion of the retainer, whereby said disk may be telescoped over said cylindrical portion, said inner circular edge of the disk being normally of slightly less diameter than the external diameter of said cylindrical portion of the retainer, the inner region of the disk presenting a frusto-conical contour in cross section whereby said disk may be forced onto the cylindrical portion of the retainer in one direction and will resist reverse movement thereof axially along the retainer in the other direction, and a coil spring disposed within the sleeve and surrounding said cylindrical portion of the retainer and bearing at one end against said clamping ring and at the other end against said washer.

3. In a rotary mechanical seal of the character described, in combination a washer having an inner and an outer cylindrical surface and a front face providing a radial sealing surface adapted to bear against another radial sealing surface with a running fit, a deformable sleeve of elastomeric material having a radially disposed inwardly extending flange at one end, a substantially cylindrical region at its other end and a deformable intermediate region adapted to accommodate relative axial movement between the ends of the sleeve, means for compressing the cylindrical region of the sleeve against the outer cylindrical surface of the washer to form a fluid-tight connection therebetween, a retainer having a central cylindrical portion extending into said washer and serving to support the same, and a radial wall against which the inwardly disposed flange of said deformable sleeve bears, a clamping ring in the form of a metal resilient circular disk surrounding said cylindrical portion of the retainer and having its outer peripheral region effectively bearing firmly against the inwardly extending flange of the deformable sleeve and serving to compress the same against the radial wall of the retainer, the inner region of said disk being of frusto-conical configuration having a slant angle which slopes forwardly and inwardly away from said inwardly extending flange on the sleeve and being formed with a generally circular central opening therein through which the cylindrical portion of the retainer extends, said circular opening presenting to the cylindrical portion of the retainer a relatively sharp arcuate edge portion which frictionally engages the metal of the retainer to prevent forward sliding movement of the disk on said cylindrical portion and a coil spring disposed within the sleeve and surrounding the cylindrical portion of the retainer and bearing at one end against said disk and at the other end against said washer.

4. In a rotary mechanical seal, the combination set forth in claim 3 in which said disk is formed of steel and in which the retainer is formed of brass.

5. In a rotary mechanical seal of the character described, in combination a washer having an inner and an outer cylindrical surface and a front face providing a radial sealing surface adapted to bear against another radial sealing surface with a running fit, a deformable sleeve of elastomeric material having a radially disposed inwardly extending flange at one end, a substantially cylindrical region at its other end and a deformable intermediate region adapted to accommodate relative axial movement between the ends of the sleeve, means for compressing the cylindrical region of the sleeve against the outer cylindrical surface of the washer to form a fluid-tight connection therebetween, a retainer formed of relatively soft metal and having a central cylindrical portion extending into said washer and serving to support the same, and a radial wall against which the inwardly disposed flange of said deformable sleeve bears, there being a radially outwardly extending rib on said cylindrical portion and a longitudinally extending groove on the inner cylindrical surface of the washer into which said rib slidably extends thus establishing a driving connection between the retainer and washer, a resilient clamping ring formed of relatively hard metal surrounding the cylindrical portion of the retainer and bearing firmly against the inwardly extending flange of the deformable sleeve and serving to compress the same against the radial wall of the retainer, said ring being provided with a sharp interrupted circular inner edge bearing against the cylindrical portion of the retainer, said edge biting into the metal of the retainer and serving to prevent forward shifting movement of the clamping ring relative to the retainer whereby to permanently wedge the ring against the inwardly extending flange of the sleeve, said circular edge being interrupted at one circumferential region thereof whereby said clamping ring may be telescoped over said cylindrical portion when the interrupted region of said circular edge is aligned with the radially outwardly extending rib on said cylindrical portion, and a coil spring interposed between said clamping ring and washer.

6. In a rotary mechanical seal, the combination set forth in claim 5 where said clamping ring is formed with a rearwardly extending peripheral flange which is at least partially embedded in the material of the elastomeric inwardly extending flange thus tending to exert a springing action in the clamping ring as a whole to enhance the engagement between said edge and the material of said cylindrical portion.

7. In a rotary mechanical seal of the character described, in combination a washer having an inner and an outer cylindrical surface and a front face providing a radial sealing surface adapted to bear against another radial sealing surface with a running fit, a deformable sleeve of elastomeric material having a radially disposed inwardly extending flange at one end, a substantially cylindrical region at its other end and a deformable intermediate region adapted to accommodate relative axial movement between the ends of the sleeve, means for compressing the cylindrical region of the sleeve against the outer cylindrical surface of the washer to form a fluid-tight connection therebetween, a metal retainer having a central cylindrical portion extending into said washer and serving to support the same, and a radial wall against which the inwardly disposed flange of said deformable sleeve bears, a clamping ring surrounding said cylindrical portion of the retainer, said ring being in the form of a circular disk having one side thereof bearing against the inwardly extending flange of the deformable sleeve and serving to compress the same against the radial wall of the retainer, and a series of spaced inwardly extending forwardly inclined teeth on said disk and having their ends frictionally engaging said cylindrical portion and serving to wedge the disk against said inwardly extending flange to prevent movement of the ring bodily away from the latter and a coil spring interposed between said clamping ring and washer.

8. In a rotary mechanical seal, the combination set forth in claim 7 including a rib on said cylindrical portion and an axially extending groove formed internally of said washer into which said rib extends with a sliding fit, the circumferential distance between adjacent teeth on said clamping ring being greater than the circumferential overall width of said rib, whereby the clamping ring may be telescoped over said cylindrical portion when said rib is aligned with one of the circumferential distances between adjacent teeth on said clamping ring.

9. The method of permanently mounting a seal sub-assembly, including a tubular flexible resilient sealing sleeve having an inturned flange at one end, a ringlike sealing washer to which the other end of the sleeve is sealingly secured, and a compressible coil spring interposed between the washer and inturned flange, within a relatively deep cup-shaped retainer formed of brass and having a substantially flat bottom wall and an upstanding center post, said method comprising interposing a hardened flexible steel ring having a central opening therein providing an arcuate edge portion between one end of the coil spring and said inturned flange, telescoping said sub-assembly including the steel ring over said center post and causing said inturned flange to bear against the retainer bottom wall, applying inward pressure to the retainer and washer to move the washer toward the bottom wall of the retainer and to compress said spring between the washer and steel ring to the maximum extent of which said spring is capable of compression so that a solid nonyieldable thrust is applied through the spring to the steel ring thus forcing the arcuate edge portion of the steel ring into frictional engagement with said center post and the rearwardly facing side of the ring positively against said inturned flange to compress the latter against the bottom wall of the retainer, and relieving said pressure, whereby said spring expands to its original state and said arcuate edge of the steel ring remains in frictional engagement with the material of said center post to maintain said inturned flange compressed against the bottom wall of the retainer.

References Cited in the file of this patent

UNITED STATES PATENTS

| 1,939,553 | Hill | Dec. 12, 1933 |
| 2,468,646 | Verhoff | Apr. 26, 1949 |
| 2,645,508 | Payne | July 14, 1953 |
| 2,652,575 | Bukott | Sept. 22, 1953 |

FOREIGN PATENTS

| 430,173 | Great Britain | June 14, 1935 |